United States Patent [19]

Polis et al.

[11] Patent Number: 4,567,560
[45] Date of Patent: * Jan. 28, 1986

[54] MULTIPROCESSOR SUPERVISORY CONTROL FOR AN ELEVATOR SYSTEM

[75] Inventors: Marjorie J. Polis, Morris Township, Morris County; Alan L. Husson, Hackettstown, both of N.J.

[73] Assignee: Westinghouse Electric Corp., Pittsburgh, Pa.

[*] Notice: The portion of the term of this patent subsequent to Sep. 25, 2001 has been disclaimed.

[21] Appl. No.: 530,808

[22] Filed: Sep. 9, 1983

[51] Int. Cl.[4] .................. G05B 15/02; B66B 1/00; G06F 11/16
[52] U.S. Cl. .................... 364/184; 364/132; 187/29 R; 371/12; 371/14; 371/15; 371/16
[58] Field of Search ................... 371/14, 12, 15, 16, 371/18, 25, 28, 67, 68; 187/29 R; 364/132, 184

[56] References Cited

U.S. PATENT DOCUMENTS

| | | |
|---|---|---|
| 3,321,747 | 5/1967 | Adamson . |
| 3,409,877 | 11/1968 | Alterman et al. . |
| 3,818,199 | 6/1974 | Grossmann et al. ............. 371/12 X |
| 3,854,554 | 12/1974 | Booker, Jr. ........................ 187/29 R |
| 3,875,390 | 4/1975 | Eccles et al. ................. 235/153 AE |
| 3,904,860 | 9/1975 | Huber et al. ............................ 371/16 |
| 3,908,117 | 9/1975 | Naruse et al. .......................... 371/18 |
| 3,916,178 | 10/1975 | Greenwald ............................ 371/16 |
| 3,959,638 | 5/1976 | Blum et al. .................. 235/153 AK |
| 4,046,227 | 9/1977 | Kirsch et al. ..................... 187/29 R |
| 4,114,730 | 9/1978 | Means et al. ..................... 187/29 R |
| 4,162,719 | 7/1979 | Husson et al. ................... 187/29 R |
| 4,200,226 | 4/1980 | Piras . |
| 4,234,920 | 11/1980 | Van Ness et al. ................... 364/200 |
| 4,248,327 | 2/1981 | Mandel et al. ..................... 187/29 R |
| 4,307,463 | 12/1981 | Sibley ..................................... 371/14 |
| 4,350,225 | 9/1982 | Sakata et al. ...................... 187/29 R |
| 4,473,133 | 9/1984 | Enriquez et al. ................. 187/29 R |

FOREIGN PATENT DOCUMENTS 2069178 8/1981 United Kingdom ............. 187/29 R
2077954 12/1981 United Kingdom .

Primary Examiner—Jerry Smith
Assistant Examiner—Jon D. Grossman
Attorney, Agent, or Firm—D. R. Lackey

[57] ABSTRACT

An elevator system, and method of monitoring same, which includes a plurality of elevator cars under the group supervisory control of at least first and second processors, which all share a common memory over a system bus. The first processor periodically monitors its own status, and it sets a predetermined location of the shared memory each time it finds its status to be normal. The second processor periodically checks the predetermined location, and upon finding it set, it resets it. The second processor also monitors its own status. The second processor triggers a retriggerable hardware timer each time it determines that the first processor and itself are both operating normally, with the trigger rate preventing the timer from reaching the end of a predetermined timing period. When the second processor finds the status of either processor to be abnormal, it terminates its triggering of the timer. The timer then provides a signal at the end of its timing period, which reinitializes both processors.

3 Claims, 12 Drawing Figures

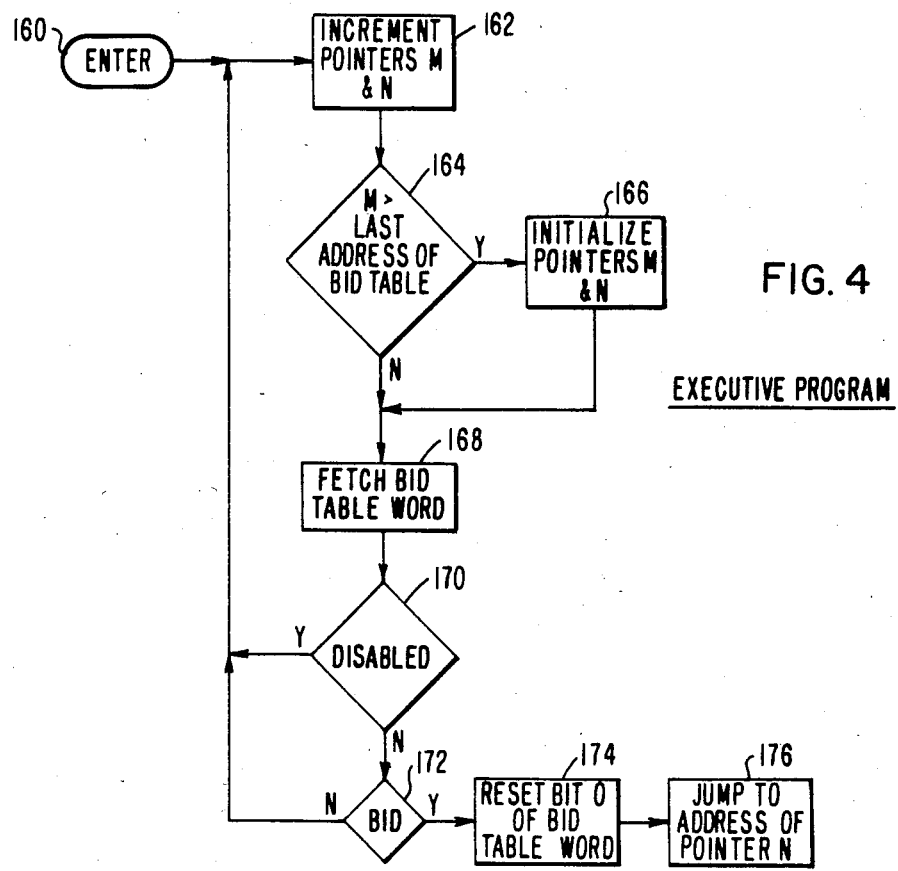
FIG. 4
EXECUTIVE PROGRAM
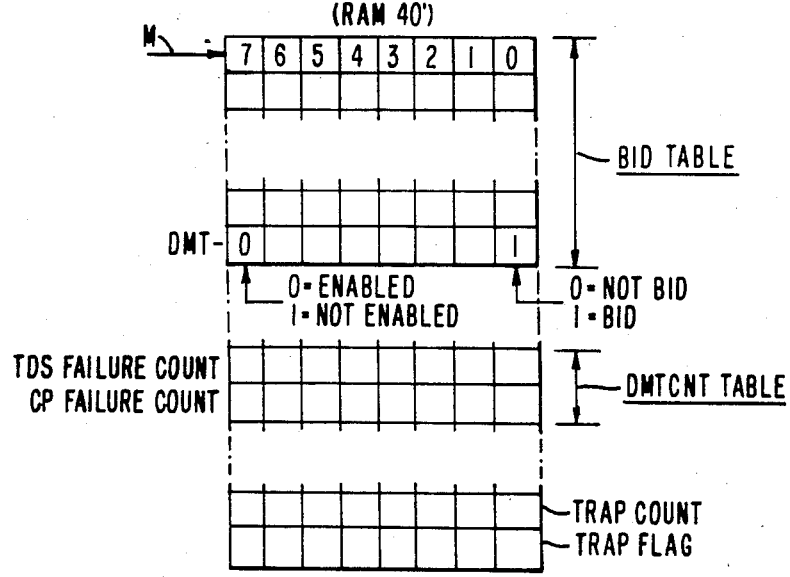

ROM MAP
(ROM 42')

RAM MAP
(SHARED RAM 36)
TIMOUT WORDS

MULTIPROCESSOR SUPERVISORY CONTROL FOR AN ELEVATOR SYSTEM

BACKGROUND OF THE INVENTION

1. Field of the Invention

The invention relates to elevator systems having a plurality of elevator cars under the group supervisory control of at least two cooperative system processors.

2. Description of the Prior Art

The use of computers, and microcomputers, in the control of elevator systems has substantially reduced the physical size of the control packages, and has increased the reliability of such systems. Computers, however, use relatively low voltages to signify a bit of information, and they also use high speed, serial, sequenced operations controlled by a system clock. Despite elaborate shielding, electrical noise can randomly occur in the signals, causing problems such as software timing and sequencing errors. Such problems can be corrected by simply reinitializing the system, in the same manner as when electrical power is initially applied to the system. Thus, when an abnormal condition is detected, the system should be automatically reinitialized, as most problems may be resolved in this manner. If reinitializing the system does not correct the problem, the system may automatically resort to a control arrangement which allows the elevator cars to operate independently without group supervisory control, such as through-trip, or block operation, if the dispatcher processor is malfunctioning, or an individual elevator car may be taken out of service, if a car controller processor is malfunctioning. The system would then continue to operate until elevator maintenance personnel can correct the problem. Problems due to random electrical noise in a processor, however, as hereinbefore stated, may be automatically resolved, without degrading elevator service, and without necessitating a special trip by elevator service personnel.

Failure of a supervisory processor in a mode which may adversely affect the ability of the elevator cars to operate properly, may be detected by monitoring a selected function of the supervisory processor. For example, the supervisory processor includes a digital computer having an operating strategy in the form of a stored software program which must be run repeatedly to continuously update the system. U.S. Pat. No. 3,854,554, which is assigned to the assignee as the present application, suggests a hard wired timing circuit, as opposed to a software timer, whose output is held high by periodic accessing by the operating program. Failure of the supervisory control to access the timing circuit at the proper frequency allows it to time out and provide a low signal which is used to prevent signals provided by the supervisory control from being considered by the car controllers of the various elevator cars.

U.S. Pat. No. 4,046,227, which is assigned to the same assignee as the present application, discloses a dispatcher processor monitor which determines if the dispatcher processor is preparing timely command words for the elevator cars.

U.S. Pat. No. 4,162,719, which is assigned to the same assignee as the present application, discloses a dispatcher monitor which starts a timer when any hall call is registered, and it resets the timer when any hall call is reset. If the timer times out, corrective action is taken, including reinitializing the system processor.

A monitoring arrangement which is based upon detecting a specific dispatcher malfunction, may miss a malfunction which degrades, or even terminates elevator service. A dispatcher processor monitor disclosed in U.S. Pat. No. 4,397,377, which is assigned to the same assignee as the present application, monitors each registered call for elapsed registration time, to detect a dispatcher malfunction. This arrangement will detect a dispatcher malfunction, regardless of the source of the problem. Each call is subjected to a threshold test to make sure it has been registered for a sufficient time to be of concern. Calls which pass the threshold test are subjected to traffic condition tests, and a dynamic call registration time test. The dynamic call registration time test is determined according to the number of in-service elevator cars capable of serving the monitored call. If the call registration time fails a traffic condition test, or exceeds the dynamic threshold, the monitor takes corrective action.

SUMMARY OF THE INVENTION

The present invention is a new and improved elevator system, and method of operating same, wherein the elevator system has at least two processors which cooperatively provide the group supervisory function for a plurality of elevator cars. The monitoring arrangement and method of the invention may operate independently of any other monitoring function, or it may operate in conjunction with another dispatcher monitoring arrangement, such as the arrangement disclosed in the hereinbefore mentioned U.S. Pat. No. 4,397,377.

The elevator system of the present invention utilizes a memory shared by the cooperative processors to provide a monitoring arrangement for all of the processors engaged in the group supervisory function, while reducing hardware requirements to a minimum. The invention also enables standard hardware to be utilized, without costly, time-consuming modification thereof.

Regardless of the number of processors engaged in the group supervisory function, only a single hardware timer package is utilized, with one of the processors being selected to trigger the hardware timer. This processor is called the master processor, and the remaining processors which cooperate therewith are called slave processors. Each slave processor is periodically checked by the master processor in an arrangement whereby each slave processor includes a software module which periodically checks the status of its associated processor. After each check, if the status has been found to be normal, the slave processor sets a predetermined location in the shared memory. The master processor periodically accesses each predetermined location of the shared memory, and upon finding the accessed location set, it determines the operation of the associated slave processor to be normal, and it resets the predetermined location.

The master processor also includes a software module which checks its own status. If it finds the status of each slave processor to be normal, and if it finds its own status to be normal, it triggers the hardware timer. The trigger frequency for normal operation will retrigger the timer before it times out, i.e., before it reaches the end of a predetermined timing period.

If the master processor finds a predetermined location has not been updated, i.e., not set, it may use this finding as a signal that the associated slave processor is operating abnormally, if the update rate by the slave is much faster than the rate at which the master processor is accessing the predetermined location of shared memory. Since this will not normally be the case, an abnormal amount of time without updating by a slave processor may be established by using successive findings of no memory update by a specific slave processor to increment a software count for this processor. If a predetermined count is reached, the master processor will cease triggering the hardware timer package, allowing it to time out. When it times out, the timer provides a signal for each processor involved in the group supervisory function, which signal attempts to reinitialize each processor. In like manner, if the master processor finds its own status to be abnormal, it will also stop providing trigger signals for the timer package, with the same result. Should the software module in any processor fail to run, including the software module in the dispatcher processor, the hardware timer will not be triggered, and all processors will be reinitialized.

BRIEF DESCRIPTION OF THE DRAWINGS

The invention may be better understood, and further advantages and uses thereof more readily apparent, when considered in view of the following detailed description of exemplary embodiments, taken with the accompanying drawings in which:

FIG. 4 is a flow chart of an exemplary Executive program module which may be used to execute program modules which have been placed in bid;

FIG. 5 is a RAM map of the random access memory of the master processor, showing a bid table, count table, trap count and trap flag used by the DMT software module of the master processor;

DESCRIPTION OF PREFERRED EMBODIMENTS

Figure 1A:
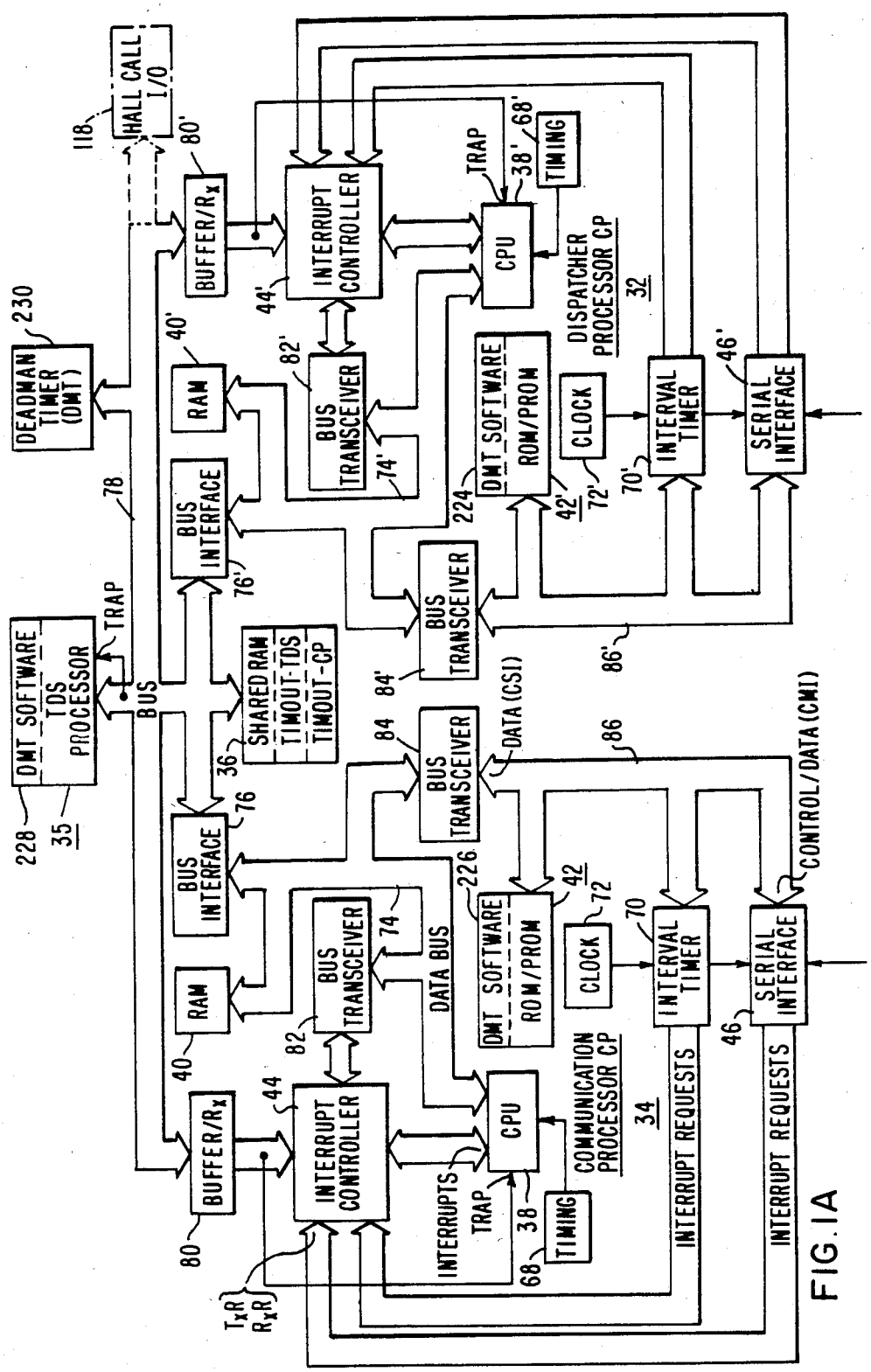
FIGS. 1A and 1B may be assembled to provide a partially schematic and partially block diagram of an elevator system having a dead man timer (DMT) arrangement constructed according to the teachings of the invention.
Figure 1B:
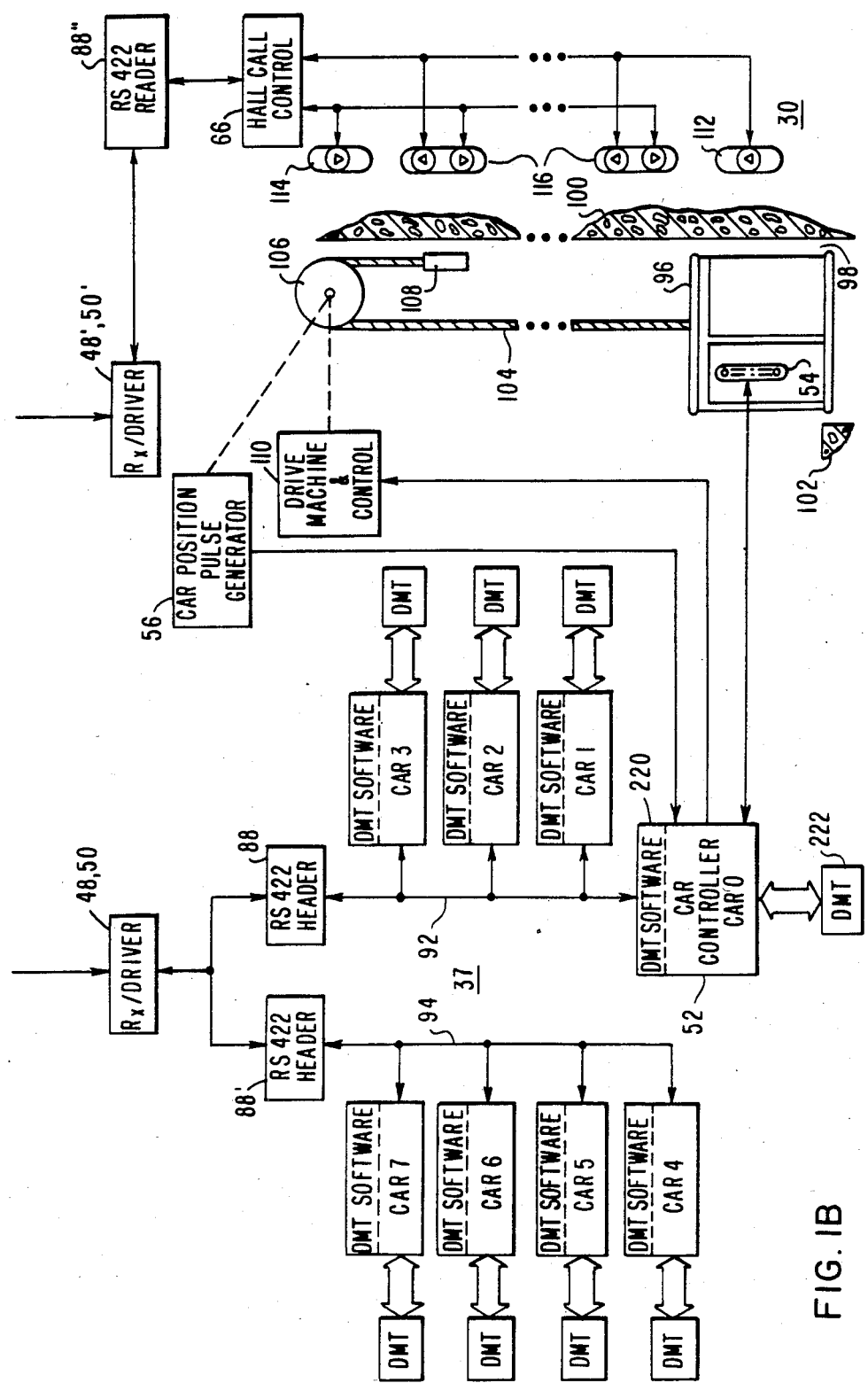

Referring now to the drawings, FIGS. 1A and 1B may be assembled to show a new and improved elevator system 30 constructed according to the teachings of the invention. Broadly, the elevator system 30 includes a plurality of processors which cooperatively provide a group supervisory control function for a plurality of elevator cars, such as a dispatcher processor 32 (DP), which includes a suitable digital computer, a communication processor 34 (CP), a traffic director station processor 35 (TDS), a random access memory 36 (RAM), which is shared by the DP, CP and TDS, and a plurality of elevator cars, referred to generally with reference 37.

CP 34 includes a central processing unit 38 (CPU), read and write control for enabling CP 34 to utilize the shared memory 36, a random access memory 40 (RAM), a read-only memory 42 (ROM), an interrupt controller 44, a parallel-to-serial interface 46, and drivers and receivers 48 and 50, respectively, which communicate with the elevator cars 37.

DP 32 includes functions similar to those of CP 34, with like functions being identified with the same reference numerals, except for a prime mark.

TDS 35 may have functions similar to those of DP 32 and CP 34, and thus are not shown in detail. An exemplary TDS arrangement is shown in U.S. Pat. No. 4,157,133, which is assigned to the same assignee as the present application.

Each of the plurality of elevator cars, shown generally at 37, include similar apparatus, with only elevator car 0 of an eight car bank being shown in detail. For example, car 0 includes a car controller 52, which includes such functions as the floor selector, speed pattern generator, door operator, hall lantern control and drive motor control. Car call control 54 includes a car call station for passengers to register car calls. Suitable car position control 56 enables the floor selector to keep track of the car position.

In general, data between the interface 46 and the elevator cars 37 is preferably handled serially, with separate serial data links handling data to and from the elevator cars. The remaining data transfers are via parallel data buses.

DP 32 includes read and write control for accessing the shared memory 36. Suitable hall call control 66 is also provided, which includes the up and down hall call pushbuttons for registering calls for elevator service. The hall calls are directed to DP 32 via the hall call control 66.

Broadly, as disclosed in detail in application Ser. No. 447,059, filed Dec. 6, 1982, entitled "Elevator System", now U.S. Pat. No. 473,133 CP 34 writes car status information (CSI) into the shared memory 36, DP 32 reads the shared memory 36 to obtain CSI. DP 32 prepares car mode information (CMI) for the elevator cars, using CSI, the hall calls and its built-in strategy, which information directs the elevator cars 37 to serve the registered hall calls according to the strategy. DP 32 writes CMI into the shared memory 36, and CP 34 reads the shared memory 36 to obtain CMI for the elevator cars 37. TDS 35 reads shared memory 36 to obtain CSI for display.

More specifically, CP 34, DP 32 and TDS 35 are microcomputers, such as Intel's iSBC 80/24 ™ single board computer. The CPU 38 is Intel's 8085A microprocessor which is connected to a timing function 68. The timing function 68 may include a clock, such as Intel's 8224. The interrupt controller 44, which may be Intel's 8259A, provides interrupts for CPU 38. The serial interface 46 may be Intel's 8251A. An interval timer 70, such as Intel's 8253, and clock 72, such as Intel's 8224, provide timing for interface 70, and additional interrupt requests for controller 44.

CPU 38 communicates with the shared memory 36 via a 16 bit address/data bus 74 (ADO-AD15), a bus interface 76, and a system bus 78. System bus 78 is in common with memory 36, DP 32 and TDS 35, and is also referred to as the common bus.

Interrupt controller 44 can receive information from the system bus 78 via a buffer/receiver 80, such as T.I.'s 74LS240, and it is in communication with the address-/data bus 74 via a bus transceiver 82, such as Intel's 8287. A similar bus transceiver 84 separates bus 74 from a bus 86. Bus 86 is connected to the serial interface 46, the interval timer 70 and the ROM 42.

The apparatus located between interface 46 and the elevator cars 37 includes the driver 48 and receiver 50, RS422 headers 88 and 88', and serial data links 92 and 94. Clock 72, interval timer 70, serial interface 46, driver 48, receiver 50, and headers 88 and 88' may be mounted on a separate board, such as Intel's iSBX 351 ™ Serial Multimodule ™ Board, which may be plugged into the 80/24 board. The driver 48 and receiver 50 may be quad RS422 driver (Motorola's MC 34878), and quad RS422 receiver (Motorola's MC 34868), respectively. Each of the elevator cars, such as elevator car 0, in addition to the car controller 52, includes an elevator cab 96 mounted for vertical, guided movement in the hoistway 98 of a building 100 to serve the floors therein, such as the floor indicated by reference numeral 102. For example, if elevator system 30 is a traction elevator system, cab 96 may be connected to a plurality of wire ropes 104, which are reeved over a traction sheave 106 and connected to a counterweight 108. Sheave 106 is driven by a traction drive machine 110, which is under the control of the car controller 52. The car position control 56, as illustrated, may develop distance pulses in response to a pulse wheel (not shown) which rotates when the elevator cab 96 moves. A pulse is generated for each predetermined standard increment of car movement, such as a pulse for each 0.25 inch of car movement. The car controller counts the pulses, incrementing and decrementing the count according to travel direction, and it compares the count with the address of the floors of the building, which addresses are also in the terms of a pulse count, describing the location of the floor relative to the bottom floor.

Hall calls, which may be produced by hall buttons located at the floors of building 100, such as the up pushbutton 112 located at the lowest floor, the down pushbutton 114 located at the highest floor, and up and down pushbutton combinations 116 located at the intermediate floors, may be serialized by hall call control and directed through an RS422 header 88", a receiver 50' and then to the serial/parallel interface 46'. Alternatively, the hall calls may be brought into the common bus 78 in parallel through a separate I/O board with this option being indicated by the hall call I/O function 118 shown in broken outline in FIG. 2A.

Each car controller, such as car controller 52 for car 0, may include a microcomputer, and each microcomputer may be monitored by a dead man timer (DMT) arrangement which includes a DMT software package 220 and a DMT hardware timer 222.

According to the teachings of the invention, DP 32 includes a DMT software package 224, CP 34 includes a DMT software package 226, and TDS 35 includes a DMT software package 228. A single DMT hardware package 230 is utilized in the supervisory function, notwithstanding the use of a plurality of separate DMT software packages in this function. The hardware package 230 may plug into an 80/24 board of one of the processors, and this will automatically provide access for the package 230 to the system bus 78. It may also plug directly into the back plane if there are no spare connectors on the CPU board. DP 32, in the exemplary embodiment of the invention, has such a spare connector on its 80/24 board, and thus, the DMT package 230 is connected to it. The microcomputer or processor to which the DMT package is attached will be called the master processor, which is DP 32 in this case, and the remaining microcomputers which cooperate in the group supervisory function will be referred to as slave processors. This is true, notwithstanding that CP 34 may be the master processor with reference to priority in gaining access to the system bus 78.

Figure 2A:
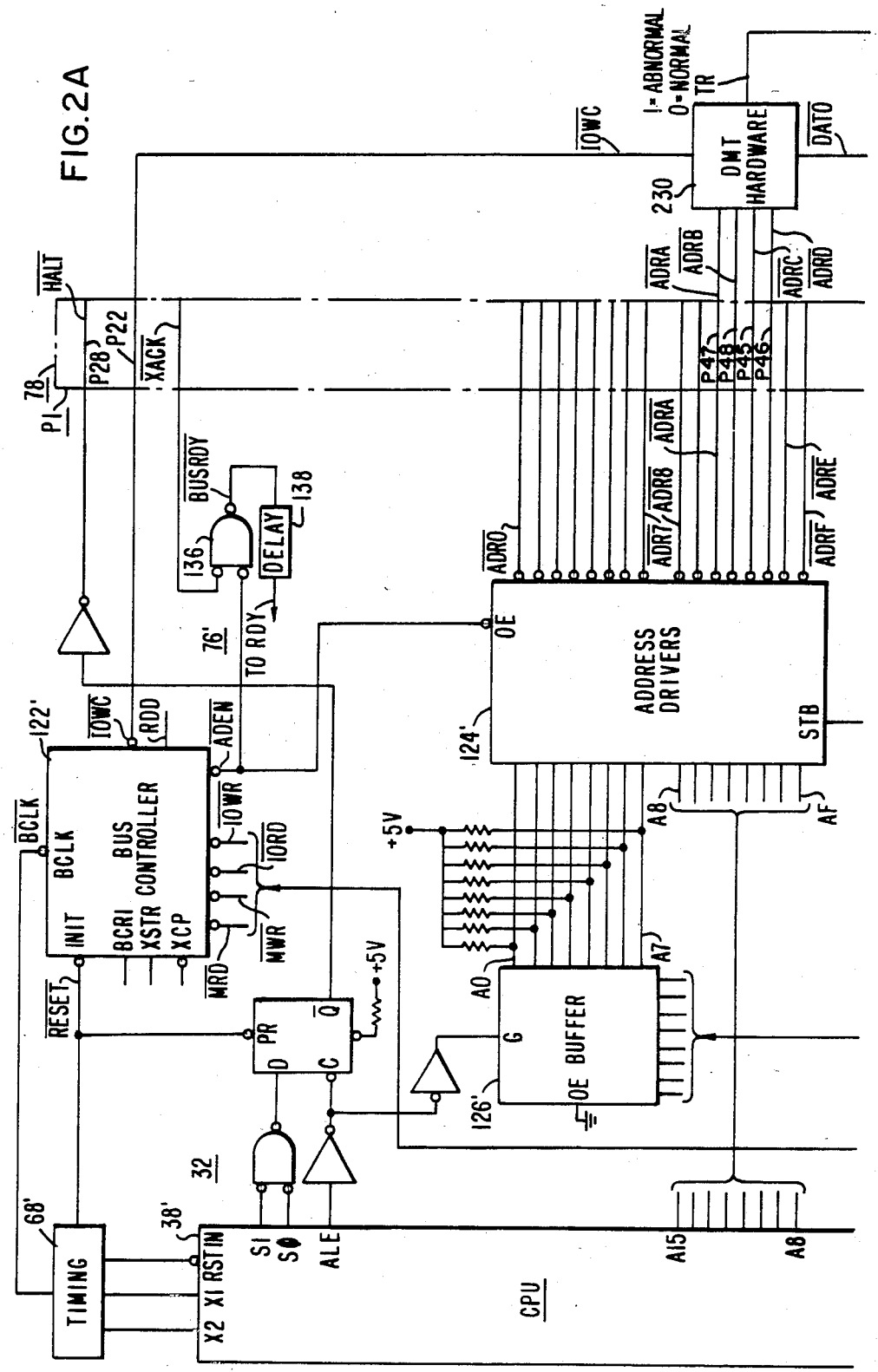
FIGS. 2A and 2B may be assembled to provide a more specific schematic diagram of certain of the functions shown in block form in FIGS. 1A and 1B, including the central processing unit (CPU) of a master processor, a bus interface, a system bus, and the connection of the DMT hardware to the system bus.
Figure 2B:
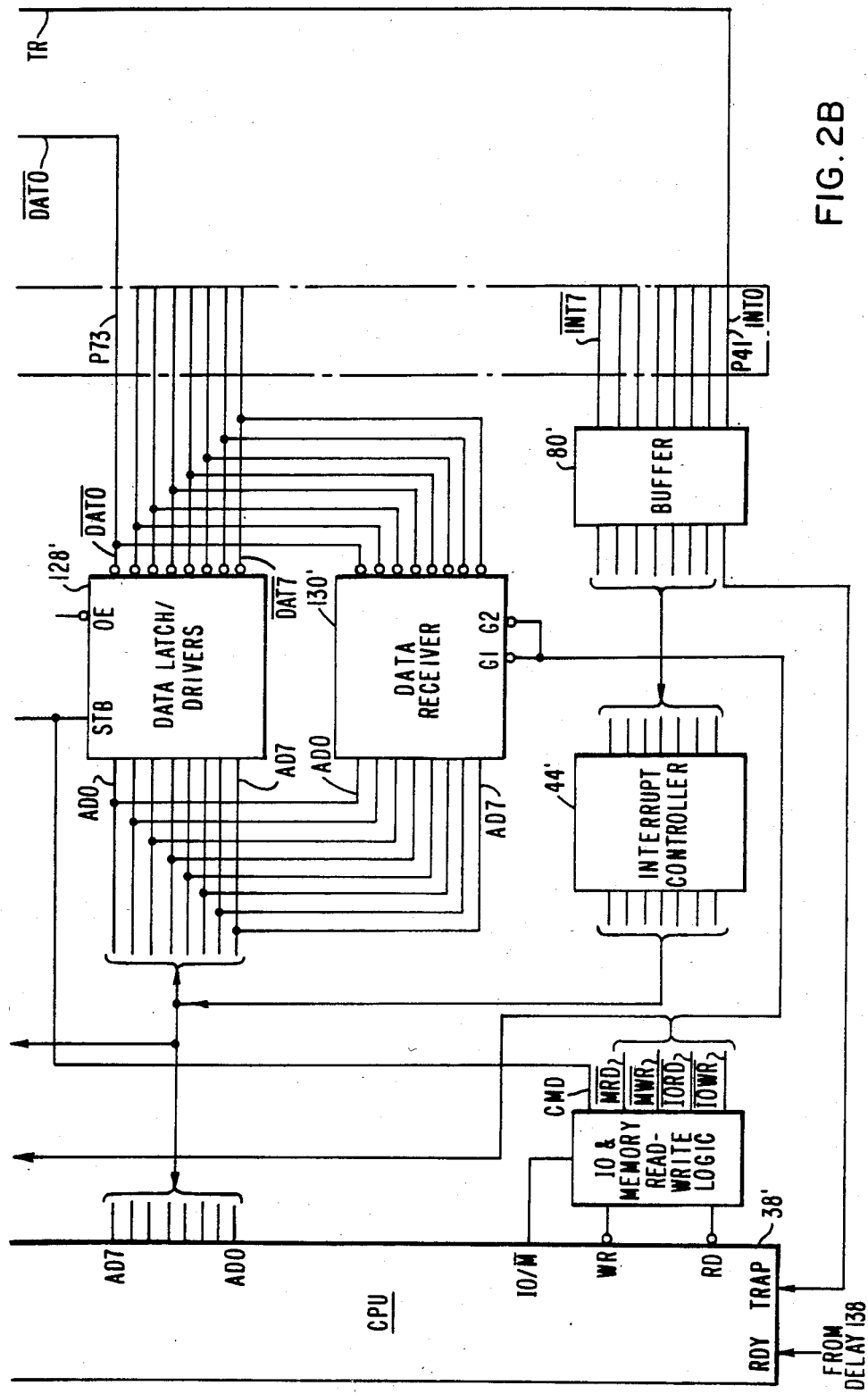

FIGS. 2A and 2B may be assembled to provide a detailed schematic diagram of bus interface 76, system bus 78, timing 68', CPU 38', and the interconnection of DMT hardware 230 to a connector which connects the DMT hardware 230 to DP 32 and the system bus 78. Bus connector P1, and an auxiliary connector P2 (not shown), form the common bus 78 which interconnects CP 34, DP 32, TDS 35, DMT package 230, and shared memory 36, as well as any other boards which might be used in the system. These connectors also connect the various boards of the system to the power supply.

The timing function 68' provides a 4.8 MHz timing signal for the X1 and X2 inputs of CPU 38', and a reset signal $\overline{\text{RESET}}$, used for initialization upon power-up, and reinitialization when a malfunction is detected, as will be hereinafter described.

Bus interface 76' includes a bus controller 122', address drivers 124', buffer 126', data latch/drivers 128', and a data receiver 130'. Bus controller 122 arbitrates requests by its own board for use of the system or common bus 78. When control of the system bus 78 is acquired, the bus controller generates a memory read signal $\overline{\text{MRDC}}$, a memory write signal $\overline{\text{MWTC}}$, an I/O read signal $\overline{\text{IORC}}$, or an I/O write signal $\overline{\text{IOWC}}$, according to commands $\overline{\text{MRD}}$, $\overline{\text{MWR}}$, $\overline{\text{IORD}}$ and $\overline{\text{IOWR}}$, respectively, produced by CPU 38'. Bus controller 128' then gates the address of the memory or I/O device onto the address lines $\overline{\text{ADR0-ADRF}}$, it provides a true output signal $\overline{\text{ADEN}}$ to input OE of the address drivers 124', and it gates data from CPU 38' onto the data bus $\overline{\text{DAT0-DAT7}}$, using its RDD and $\overline{\text{ADEN}}$ outputs, which are connected to input OE of the data latch/drivers 128'.

An off-board memory or I/O request by CPU 38 provides signals for the BCRI (bus request) and XSTR (transfer start request) inputs of bus controller 122, which starts the bus arbitration in synchronism with bus clock signal $\overline{\text{BCLK}}$. The address and data enable output $\overline{\text{ADEN}}$ is driven low when control of the system bus 78 is obtained. When an external acknowledge signal $\overline{\text{XACK}}$ is received from the addressed device, gate 136 generates a true signal $\overline{BUSRDY}$, which is applied to CPU 38 at input RDY via a delay circuit 138.

When the bus transaction is complete, the transfer input $\overline{XCP}$ of bus controller 122 is driven low.

When CPU 38' wishes to trigger the DMT hardware package 230, it generates a true I/O write signal $\overline{IOWR}$, which results in bus controller 122' providing a true I/O write signal $\overline{IOWC}$ for the system bus 78, and thus for DMT 230. CPU 38' also prepares the outputs the address of the DMT 230, which address appears on the address bus. The address will require only a few of the address lines, with the actual number depending upon the number of external devices or peripherals to be addressed. As illustrated, four lines $\overline{ADRA}$ through $\overline{ADRD}$ are applied to DMT 230. After being addressed by the correct address on the address lines $\overline{ADRA}$ through $\overline{ADRD}$, and enabled by a true write signal $\overline{IOWC}$, the actual triggering is accomplished when the CPU outputs a logic one pulse to the data port, i.e., the $\overline{DAT0}$ line of the data bus. The triggering may be accomplished by the trailing edge of the logic one pulse, for example.

Figure 3:
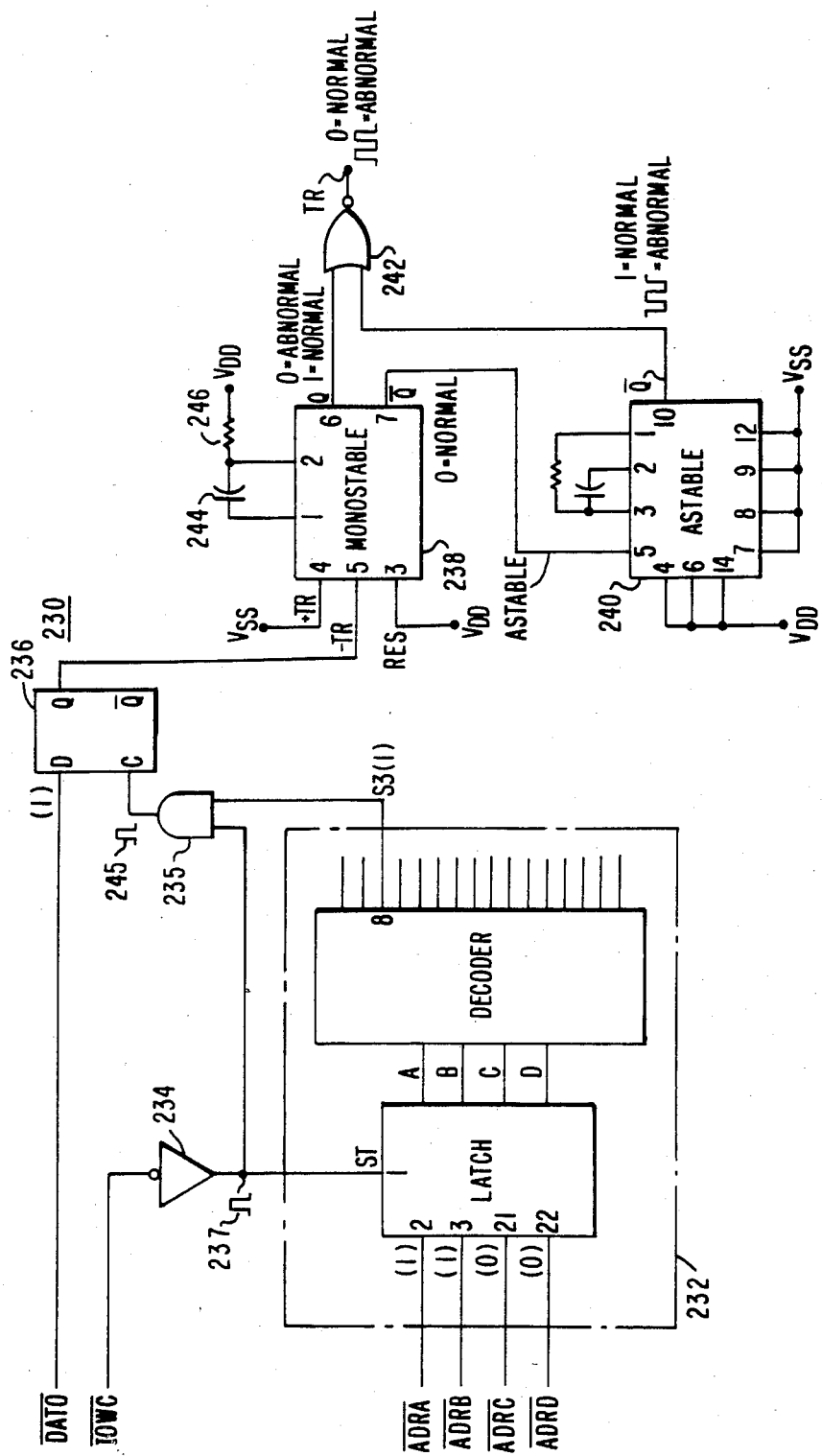
FIG. 3 is a schematic diagram of an exemplary hardware timer package which may be used for those shown in block form in FIGS. 1A and 1B, and in FIGS. 2A and 2B.

FIG. 3 is a schematic diagram of an exemplary embodiment of the DMT hardware package 230. The address lines $\overline{ADRA}$-$\overline{ADRD}$ are applied to the latch function of a 4-bit latch/4-to-16 line decoder 232, such as RCA's CD4514B, with the I/O write signal $\overline{IOWC}$ being applied to the strobe input of the latch function via an inverter gate 234. Inverter gate 234 provides an output pulse 237. The address on the address lines when the output pulse 237 of inverter gate 234 is high will be latched and applied to the decoder function. Assuming the address of DMT 230 is 0011, output S3 of the decoder 232 will be used, as it will be driven high when decoder 232 is addressed with this address.

DMT 230 also includes a dual input AND gate 235, a D-type flip-flop 236, a retriggerable monostable multivibrator 238, such as RCA's CD4098BE, an astable multivibrator 240, such as RCA's CD4047AD, and a NOR gate 242. The data line $\overline{DAT0}$ is connected to the D input of flip-flop 236. The output of inverter gate 234 and the S3 output of decoder 232 are applied to the inputs of AND gate 235, with the output of AND gate 235 being applied to the clock input C of flip-flop 236. The Q output of flip-flop 236 is applied to the trailing edge trigger input-TR of the monostable 238. The values of a capacitor 244 and a resistor 246 are selected to provide a predetermined timing period when monostable 238 is triggered. This timing period is selected to exceed the time between the trigger signals provided by CPU 38' during normal operation of all of the processors which take part in the group supervisory function. Thus, the Q output of monostable 238, which is high during the timing period, will remain high as long as monostable 238 is triggered at a normal rate.

The $\overline{Q}$ output of monostable 238 is applied to the astable input of the astable 240. Since $\overline{Q}$ will normally be low when the monostable 238 is triggered at a normal rate, the $\overline{Q}$ output of astable 240 will be high. The Q and $\overline{Q}$ outputs of the monostable 238 and the astable 240, respectively, are applied to the inputs of NOR gate 242.

Each time CPU 38' determines that CP 34 and TDS 35 are operating normally, and that its own status is normal, CPU 38 appllies a logic one signal to $\overline{DAT0}$ and thus to the D input of flip-flop 236. CPU 38' also provides a true I/O write signal $\overline{IOWC}$, and it applies the address 0011 of the peripheral DMT 230 to the address lines $\overline{ADRA}$ through $\overline{ADRD}$. This results in a clocking pulse 245 being provided by the output of AND gate 235, which clocks the logic one pulse occurring at the D-input of flip-flop 236 to the Q output. CPU 38' then applies a logic zero to $\overline{DAT0}$, and clocks this to the Q output of flip-flop 236. This results in a "trailing edge" which triggers monostable 238, maintaining its Q output high.

If CPU 38' detects an abnormal condition, it terminates the triggering of the monostable 238. The monostable 238 times out and its Q output goes low while its $\overline{Q}$ output goes high to activate the astable 240. The astable 240, when activated, provides a pulse train at its Q output. Thus, the output TR of NOR gate 242 changes from a logic zero to a pulse train, with the rising edge of each pulse, and the resulting high level, providing an interrupt signal for DP 32, CP 34, and TDS 35, as will be hereinafter explained.

Figure 6:
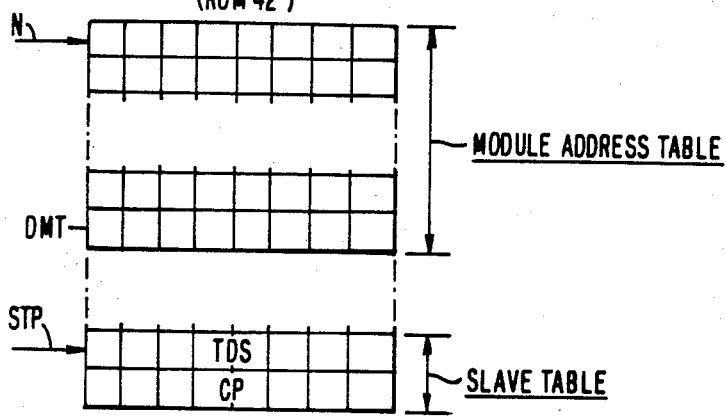
FIG. 6 is a ROM map of the read-only memory of the master processor, showing a module address table, and a table listing each of the slave processors involved in the group supervisory function.

FIGS. 4, 5, and 6 illustrate an exemplary format for controlling the sequence of program execution. Certain of the programs are in the form of modules, and they are only run when there is a need to run them. When a need to run for a particular module is detected, such as by another module, the program is placed in bid. A module may also place itself in bid, at the completion of its running. Since the DMT software module 224 should run every time, it should place itself in bid. If a program detects that another module should not run, even when placed in bid, this program or module can disable such other module. The DMT software should not be disabled by any other module. The program for executing modules which have been placed in bid in a predetermined priority order, is called the Executive program, and it is shown in FIG. 4. The bid entries for all of the modules are grouped together at a predetermined location in RAM 40' to form a Bid Table. A suitable format for the Bid Table is shown in FIG. 5, with the DMT module being listed adjacent to one of the bytes of the bid table. Each module is a program stored in ROM 42, with each module having a predetermined starting address. When the executive program wishes to run a module, it jumps to the starting address of the module in ROM 42. The starting addresses of all modules are grouped together at a predetermined location in ROM 42', to form a Module Address Table. The DMT module address is listed adjacent to one of the bytes of the Module Address Table. A pointer M points to bid table entries in the Bid Table, and a pointer N points to module address entries in the Module Address Table.

The Executive program, shown in a detailed flow chart form in FIG. 4, is entered at a predetermined starting address in ROM 42', which is shown generally at 160 as the "start" terminal. Each module, when it completes its run, returns to this starting address. Step 162 increments pointers M and N, since pointers M and N will point to the bid table entry and starting address for the last module run. Incrementing the pointers thus brings the executive program to the next module and the search continues in a circular manner from the point of which the last module was executed. Step 164 determines if the complete Bid Table has been checked. If it has, step 166 initializes pointers M and N to the starting location. If step 164 finds the Bid Table has not been completely traversed, step 168 fetches the bid word at pointer M so it can be checked to see if the associated module is enabled, and, if so, whether or not this module has been placed in bid. As illustrated, bit position 7 of the bid table word may be tested to check enablement, and bit position 0 may be checked to see if the program has been placed in bid. Accordingly, step 170 checks to see if bit position 7 of the bid table word is a logic zero or a logic one. If a logic one, the module has been disabled and the program returns to step 162 to check the next module in the bid table sequence. If a logic zero, the module has not been disabled, and step 172 checks bit position 0 of the bid table word to see if the module has been placed in bid. If it is a logic zero, it has not been bid, and the program returns to step 162. If this bit position is a logic one, it has been placed in bid, step 174 resets bit position 0, and step 176 jumps to the address in ROM 42 which pointer N of the Module Address Table is pointing to. When this module completes its run, it returns to the starting address 160 of the executive program, as hereinbefore described.

Figure 7:
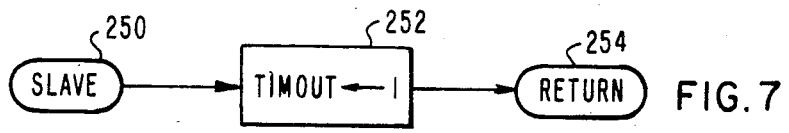
FIG. 7 is a flow chart which sets forth an exemplary program module which may be used by each slave processor to set a predetermined location in shared memory.
Figure 8:
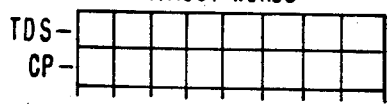
FIG. 8 is a RAM map of the memory shared by all of the processors involved in the group supervisory control function, setting forth the predetermined locations of the memory which are accessed by the slave processors and by the master processor in an arrangement whereby the master processor determines the status of each slave processor.

FIG. 7 is an exemplary flow chart of a DMT software module which each of the slave processors CP 34 and TDS 35 may use as their DMT software package shown generally at 226 and 228, respectively, of FIG. 1. The DMT slave software module would be formatted and run by each slave processor in the manner described relative to FIGS. 4, 5 and 6. A simple but effective status check is to insure that the deadman timer software module is executing on every pass, as it is always bid. This insures that the software is running and is not hung up somewhere. In this simple status check, the DMT software does not have to actually check anything; it simply sets an associated word in memory referred to as word TIMOUT. If the software gets hung up, the DMT software won't run, TIMOUT won't get set, and the deadman timer hardware will restart the system. More specifically, the module is entered at its starting address, referenced generally at 250, and step 252 accesses a predetermined location of shared memory 36 assigned to it, and it sets a byte called TIMOUT, i.e., it sets this word to $01_H$. The module exits at 254. FIG. 8 is a RAM map of shared memory 36 which illustrates the TIMOUT words for CP 34 and TDS 35.

Figure 9:
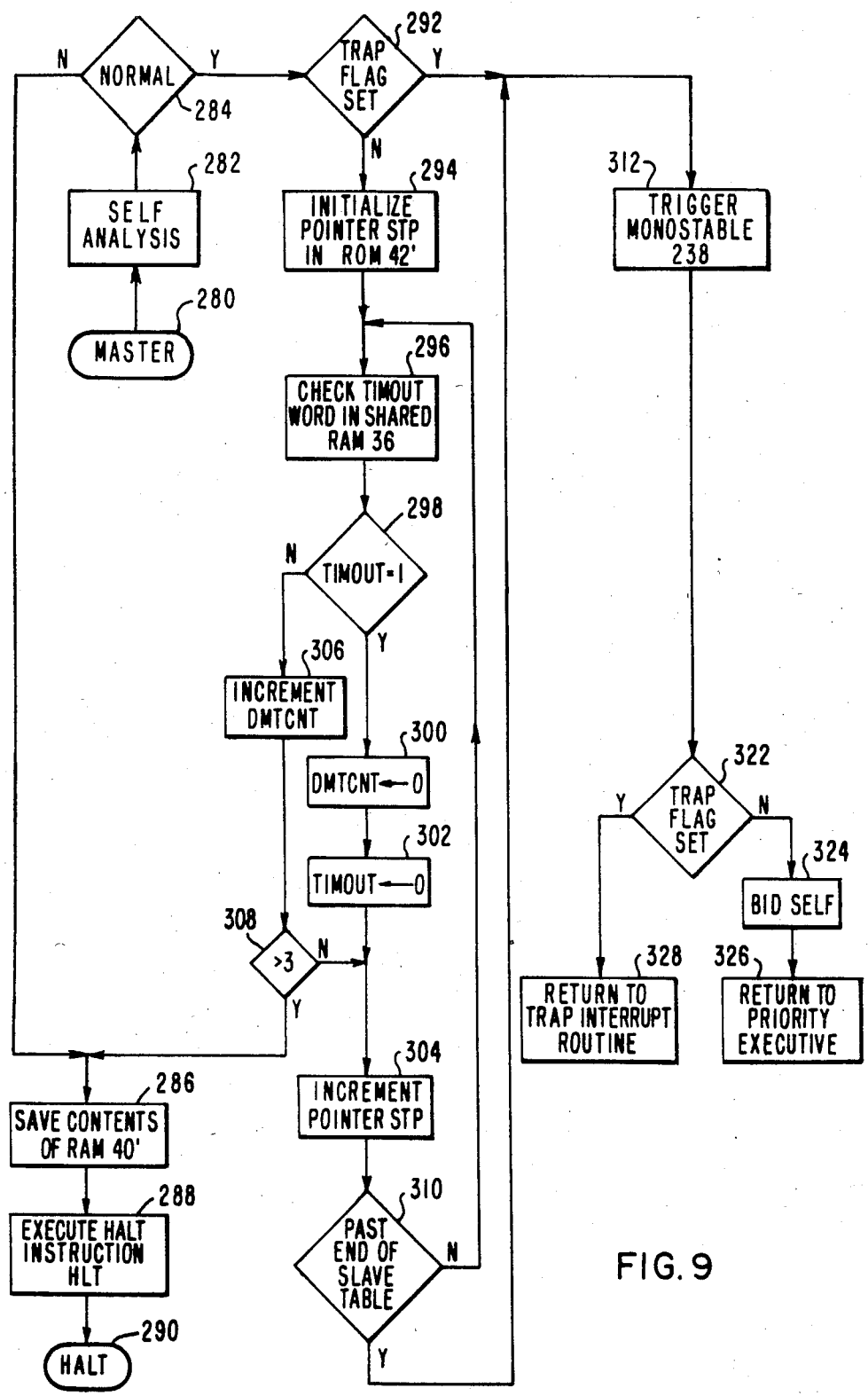
FIG. 9 is a detailed flow chart of a program module which may be used by the master processor to check the status of the slave processors, as well as to check its own status.

FIG. 9 is an exemplary flow chart of the DMT software module 224, which is run by DP 32 as described relative to FIGS. 4, 5 and 6. The DMT master program is entered at its starting address, indicated generally at 280. The starting address is found in the Module Address Table shown in FIG. 6. DP 32 may check any number of items in step 282 to ensure correct dispatching functions, such as by running the system checks disclosed in the hereinbefore-mentioned U.S. Pat. No. 4,397,377. If any abnormal operation is discovered by these checks, indicated by step 284, the program will proceed to steps 286, 288 and 290. Step 286 saves the contents of RAM 40' for later analysis, step 288 executes the halt instruction HLT, and the program cycles in this state, as indicated at 290, until broken out by a RESET IN, or an interrupt.

If the self analysis by DP 32 finds everything checked to be operating correctly, step 284 proceeds to step 292. In this exemplary embodiment, the trap interrupt program shown in FIG. 10, and to be hereinafter described, can call this module to check the DP status following a trap interrupt and an attempt at reinitialization. As hereinbefore stated, this module is normally run as described relative to FIGS. 4, 5 and 6. If the trap interrupt program calls this module, the trap interrupt program will set a flag in RAM 40' called the trap flag. The trap flag is shown in the RAM map of FIG. 5. If called by the interrupt program, the interrupt routine is only interested in checking the status of DP 32, as the other processors will also be in the reinitialization stage via similar trap interrupt routines, and step 292 will skip the normal checks of the other processors CP 34 and TDS 35. It will first be assumed that the trap interrupt routine shown in FIG. 10 has not called this module, and thus the trap flag will not be set. Thus, step 292 advances to step 294 which initializes a pointer STP in ROM 42', which pointer points to a Slave Processor Table. The Slave Table is shown in the ROM map of FIG. 6. The Slave Table and pointer STP are used to ensure that the status of all slave processors is checked.

Pointer STP points to the address in the shared RAM 36 where the associated processor's word TIMOUT is located. Step 296 checks this location in shared RAM 36, and step 298 tests the results of this check. If the word TIMOUT is $01_H$, the associated processor has accessed this location in a timely manner, and step 298 advances to step 300 which zeroes the software count DMTCNT for the associated processor held in a table DMTCNT in RAM 40'. This table is shown in the RAM map of FIG. 5. The DMTCNT table tabulates the number of consecutive times which DP 32 has found that the word TIMOUT for the associated processor has not been updated, i.e., SET, as will be hereinafter described. Step 300 then advances to step 302 which zeroes (resets) the word TIMOUT for the associated processor in shared RAM 36. Step 302 then proceeds to step 304 which increments pointer STP in the Slave Table.

If step 298 finds the word TIMOUT is not $01_H$ (i.e., not set), step 298 goes to step 306 which increments the failure count for the associated slave processor in the DMTCNT Table. To make sure DP 32 has given the slave being checked sufficient time to set its word TIMOUT, the software count is used, with no action being taken by DP 32 until the count reaches a predetermined value. The predetermined value is selected to signify an unreasonably long time since the processor has updated its word TIMOUT. For purposes of example, this number is selected to be four, and step 306 proceeds to step 308 to see if the count exceeds three. If it does not, step 308 proceeds to step 304 to check the next slave processor in the Slave Table, if any. If step 308 finds the failure count to exceed three, step 308 proceeds to steps 286, 288 and 290, to enter the loop HALT.

When step 304 increments pointer STP, step 310 checks to see if all of the slave processors in the Slave Table have been checked. If not, step 310 returns to step 296 to check the word TIMOUT for the next slave processor. If step 310 finds all slave processors have been checked, to arrive at step 310 with the finding that all slave processors have been checked means that all slave processors checked, including itself, are operating normally, and step 310 proceeds to step 312.

Step 312 triggers the monostable 238, as hereinbefore described relative to FIG. 3, to start a new timing period, which maintains the Q output of monostable 238 high.

Step 322 checks the trap flag in RAM 40' to determine if the program ran as a result of a trap interrupt. If the trap flag is not set, step 322 advances to step 324 which places itself in bid, and step 326 returns to the Executive. If the trap flag is set, indicating the trap interrupt routine called the module, step 322 goes to step 328 which returns to the trap interrupt routine.

Figure 10:
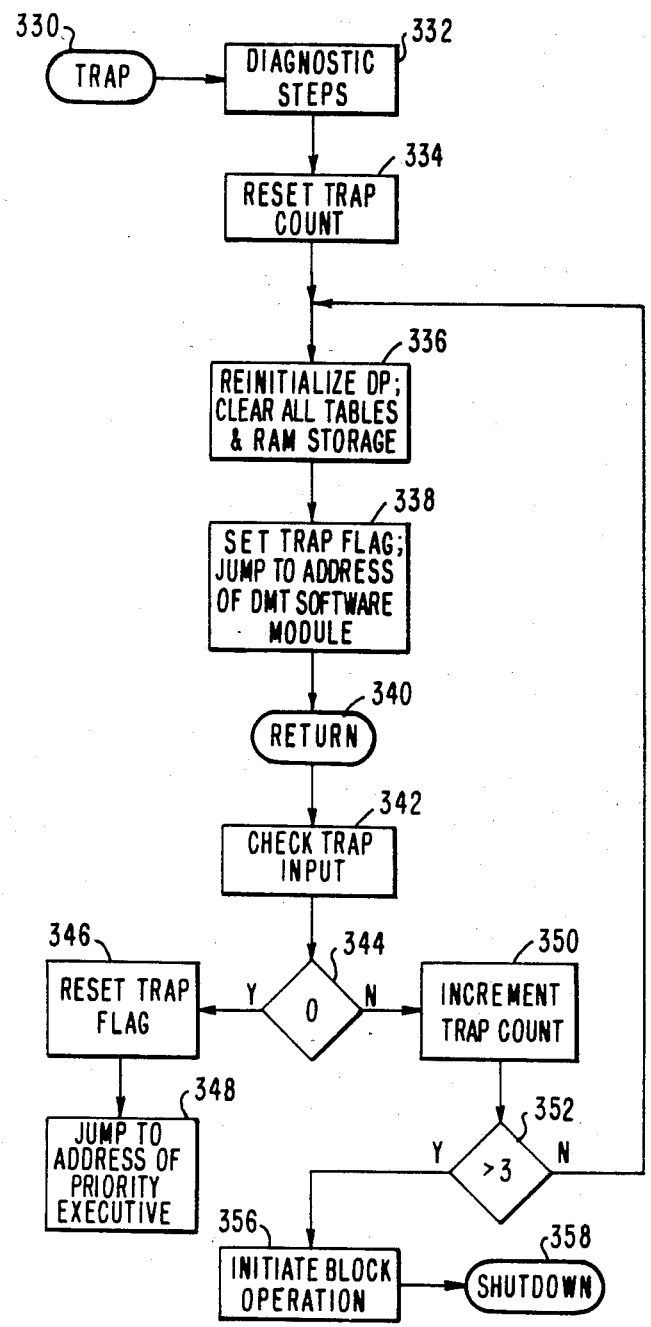
FIG. 10 is a detailed flow chart of a program module which may be used by the master processor to reinitialize itself on initial application of electrical power, and also when the malfunction monitor detects an abnormal condition and initiates reinitialization of the system.

FIG. 10 is a flow chart of a trap interrupt service routine for DP 32. Since the trap interrupt service routines for CP 34 and TDS 35 would be similar, they are not shown. When DP 32, in its program set forth in FIG. 9, detects a problem in its own status, or when it detects that a slave processor has not updated its word TIMOUT for an unreasonable length of time, monostable 238 shown in FIG. 3 is not retriggered and the output TR of NOR Gate 242 changes from a logic zero to a pulse train. The pulse train is applied to interrupt line $\overline{INT0}$ of system bus 78, which is connected to all of the processors via a suitable buffer, such as the $R_X$/buffer 80 and the $R_X$/buffer 80'. The $\overline{INT0}$ outputs of these buffers, instead of being connected to the interrupt controller 44 or 44', are connected directly to the trap interrupt inputs of the associated CPUs. Each rising edge and subsequent high level of each pulse of the pulse train provides a trap interrupt, when sampled, which attempts to reinitialize and restart the group supervisory function of the elevator system. A trap interrupt breaks the CPU out of its HALT cycle, and calls the trap interrupt service routine shown in FIG. 10. When an interrupt occurs, the contents of the program counter are pushed on the stack, and the CPU is vectored to a predetermined memory address, which is address $24_H$ for a trap interrupt. This memory address contains the starting address of the trap interrupt service subroutine. The starting address in ROM 42' for the trap interrupt service subroutine is shown generally at 330.

Step 332 performs any steps which might be desired to aid later diagnostic analysis of the cause of the trap interrupt, such as by storing the current contents of RAM 40' in an unused portion of RAM which can be called later by maintenance personnel. An "occurrence count" may also be maintained, to inform maintenance personnel of the number of times the trap interrupt has occurred. If a time-of-day clock is maintained, the time of each trap interrupt may also be stored.

Step 334 resets a "trap count" stored in RAM 40' and shown in FIG. 5. This is a different count than the "occurrence count" just mentioned, and is used to count the number of times the pulse train tries to reinitialize the system without success, so the attempts may be terminated, if desired, after a predetermined number of unsuccessful attempts. Step 336 performs all of the steps necessary to reinitialize DP 34, just as when power is initially applied, including restoring the processor's internal program counter to zero, and clearing all tables, registers and RAM storage. After reinitialization, the trap interrupt service subroutine may terminate and return control to the Executive. An unsuccessful attempt to reinitialize will then be noted in due course when the DMT software routine is run. Alternatively, the trap interrupt service subroutine may perform a self check of DP 32 and restart the monostable 238 of the DMT hardware package 230, before actually terminating its program. This alternative is set forth in FIG. 10.

More specifically, step 336 advances to step 338 which sets the trap flag in ROM 40' to indicate to the DMT software module shown in FIG. 9 that is has been called by the trap interrupt service subroutine, and the program then jumps to the address of the DMT software module. As hereinbefore described relative to FIG. 9, the DMT software module, after performing its own self check, may skip the checks of the slave processors via step 292, in order to allow sufficient time for their own trap interrupt programs to reinitialize the processors, and also time for the processors to set their words TIMOUT in shared memory 36. Step 322 then returns, via step 328, to the return point 340 of the trap interrupt service subroutine. Step 342 then samples the trap input, which should be a logic zero if the program of FIG. 9 found the status of DP 32 to be normal. If so, step 346 resets the trap flag in RAM 40', and step 348 jumps to the address of the Executive, to restart normal operation.

If step 344 finds the trap interrupt input still high, step 350 increments the trap count and step 352 checks the count to see if the number of successive unsuccessful reinitialization attempts has exceeded the predetermined number. If not, step 352 returns to step 336 to start reinitialization again.

If step 352 finds that DP 32 cannot be successfully reinitialized, step 352 proceeds to step 356. Step 356 modifies the operation of the elevator system so it will provide service without the group supervisory function. If the elevator cars will now be allowed to "see" hall calls, the system may be placed on "emergency through trip", which allows the cars to each operate terminal to terminal. If the elevator cars will be unable to "see" hall calls, the elevator system may be placed on "block operation", in which each elevator car serves a different block of floors, with each car stopping at all floors of its assigned block. Step 356 then proceeds to a shutdown mode at 358, in which the CPU cycles, such as on a HALT or HOLD state, until maintenance personnel can correct the problem and restart the system. Step 358 can also trip local and/or remote indicating devices to alert building supervisory personnel and/or remote service personnel, that service is required.

We claim as our invention:

1. An elevator system, comprising:
a plurality of elevator cars;
a control system for controlling said plurality of elevator cars including a dispatcher processor, a communication processor for polling the elevator cars for information for use by said dispatcher processor, and for selecting an elevator car to receive information from said dispatcher processor, a memory, a system bus interconnecting said dispatcher processor, said communication processor, and said memory, with said memory being shared by said master processor and said communication processor via said system bus;
said dispatcher processor including means for preparing car mode information for said elevator cars, and means for writing said car mode information into said shared memory;
said communication processor including means for reading said shared memory to obtain car mode information, and means for transmitting said car mode information to associated elevator cars;
said elevator cars including means for providing car status information;
said communication processor including means for obtaining car status information from the elevator cars, and means for writing said car status information into said shared memory;
said dispatcher processor including means for reading said shared memory to obtain said car status information;
a selected one of the dispatcher and communication processors being a master processor, with the non-selected processor being a slave processor;
said slave processor including storage means, and program means stored in said storage means for periodically setting a predetermined location of said shared memory;

said master processor including storage means, and diagnostic program means stored in said storage means, said diagnostic program means including checking means for periodically checking said predetermined location to determine if it is set or reset, resetting means for resetting the predetermined location each time the checking means finds said predetermined location set, detecting means for periodically determining if the operation of the master processor is normal or abnormal, and trigger signal means for providing trigger signals;

said trigger signal means providing a trigger signal responsive to the checking means finding said predetermined location of said shared memory set and the detecting means detecting normal operation of the master processor, with said trigger signals being provided by trigger signal means at a predetermined triggering rate when the checking and detecting means continue to respectively find said predetermined location of the shared memory set, and normal operation of the master processor;

and a single retriggerable hardware timer in communication with said master processor via said system bus, said hardware timer being responsive to the trigger signals provided by the trigger signal means of said master processor;

said hardware timer having a predetermined timing period when triggered by a trigger signal, with said predetermined timing period being selected such that the predetermined triggering rate of the trigger signals prevents said hardware timer from reaching the end of said predetermined timing period;

said trigger signal means of the master processor ceasing to provide trigger signals as a function of either said checking means finding said first predetermined location of said shared memory reset or the detecting means detecting abnormal operation of said master processor, said hardware timer applying an interrupt signal to said system bus when it reaches the end of its timing period;

said master processor and said slave processor including first and second interrupt responsive program means, respectively, which reinitialize the master processor and slave processor in response to the interrupt signal being placed on the system bus by said hardware timer.

2. The elevator system of claim 1 wherein the second program means of the master processor includes counting means for providing a count responsive to the number of times the checking means of the master processor finds the predetermined location of the shared memory reset on successive checks, and wherein the trigger signal means ceases to provide trigger signals when said count reaches a predetermined value.

3. The elevator system of claim 1 wherein the hardware timer provides a plurality of spaced interrupt signals when it reaches the end of the predetermined timing period, with the first and second interrupt responsive means being responsive to each interrupt signal, in the event a prior one of such interrupt signals does not successfully reinitialize both the master processor and slave processor.

* * * * *